(12) United States Patent
Anderson et al.

(10) Patent No.: US 8,210,091 B2
(45) Date of Patent: Jul. 3, 2012

(54) QUICK BOOSTER

(75) Inventors: Chris Anderson, Paris (FR); Raynald Sprocq, Esbly (FR); Jean-Pierre Michon, Saint Pathus (FR); Jean-Marc Attard, Villers Sous St Leu (FR)

(73) Assignee: Robert Bosch GmbH, Stuttgart (DE)

( * ) Notice: Subject to any disclaimer, the term of this patent is extended or adjusted under 35 U.S.C. 154(b) by 833 days.

(21) Appl. No.: 12/358,904

(22) Filed: Jan. 23, 2009

(65) Prior Publication Data

US 2009/0188385 A1    Jul. 30, 2009

(30) Foreign Application Priority Data

Jan. 25, 2008 (FR) ...................... 08 00417

(51) Int. Cl.
*B60T 13/569* (2006.01)
*B60T 13/10* (2006.01)
(52) U.S. Cl. ..................... 91/369.3; 91/376 R
(58) Field of Classification Search ............. 60/552, 60/554, 582; 91/369.3, 376 R
See application file for complete search history.

(56) References Cited

U.S. PATENT DOCUMENTS 7,201,456 B2   4/2007  Bacardit et al.
7,267,040 B2 *  9/2007  Attard et al. ............... 91/376 R

FOREIGN PATENT DOCUMENTS

FR          2782044       2/2000

OTHER PUBLICATIONS

FR 08 00417 Search Report and Written Opinion, 5 pages.

* cited by examiner

*Primary Examiner* — Thomas E Lazo
(74) *Attorney, Agent, or Firm* — Michael Best & Friedrich LLP

(57) ABSTRACT

The invention relates to a brake booster with a short actuating travel, in which booster the three-way valve has a moving valve seat borne by a sleeve (54). The movement of this sleeve is controlled by the piston. The invention provides a device that comprises a face (100) that is inclined with respect to the axis of the sleeve in order to allow the sleeve (54) to move gradually.

19 Claims, 14 Drawing Sheets

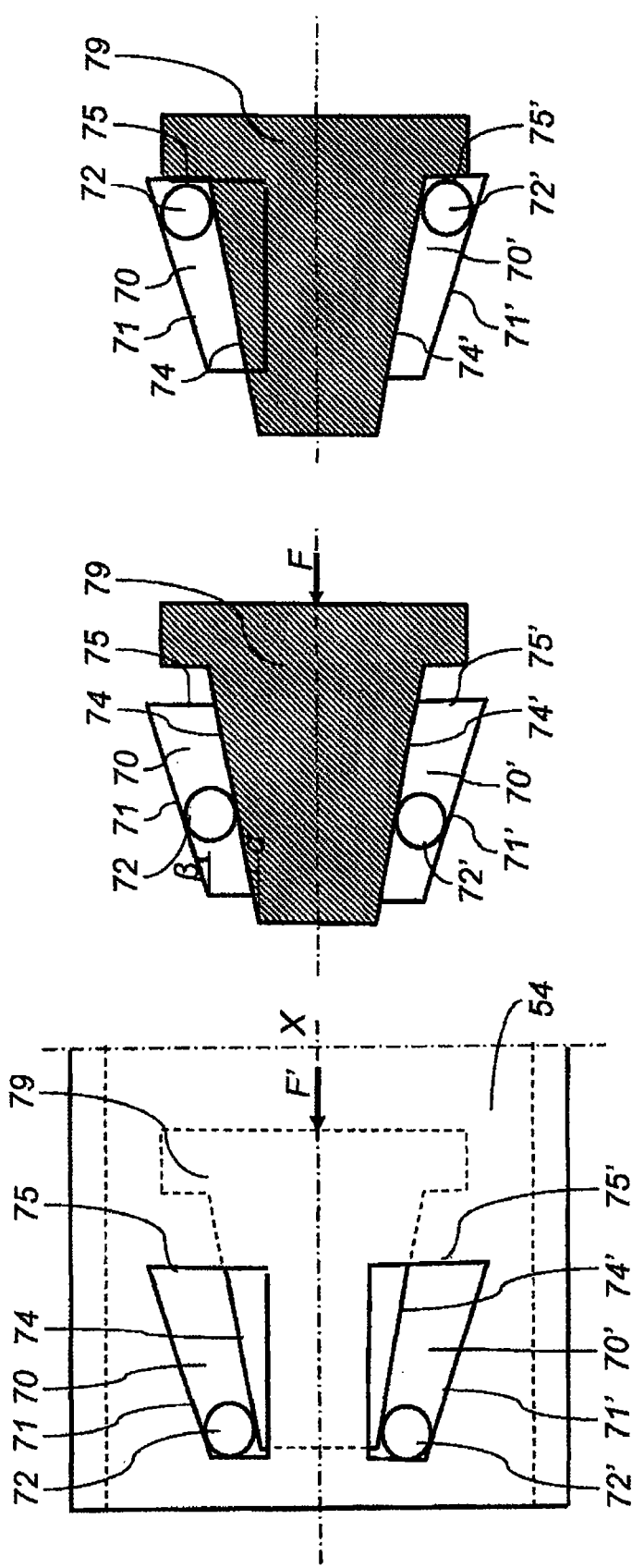

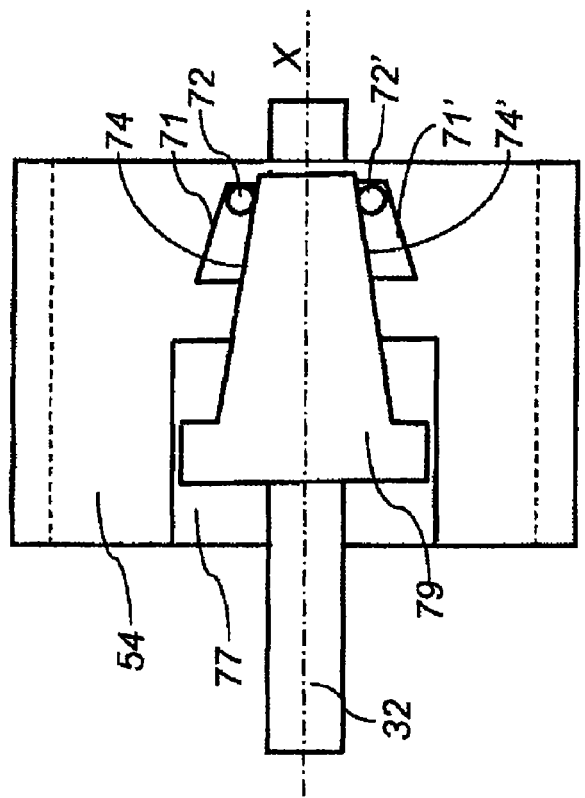
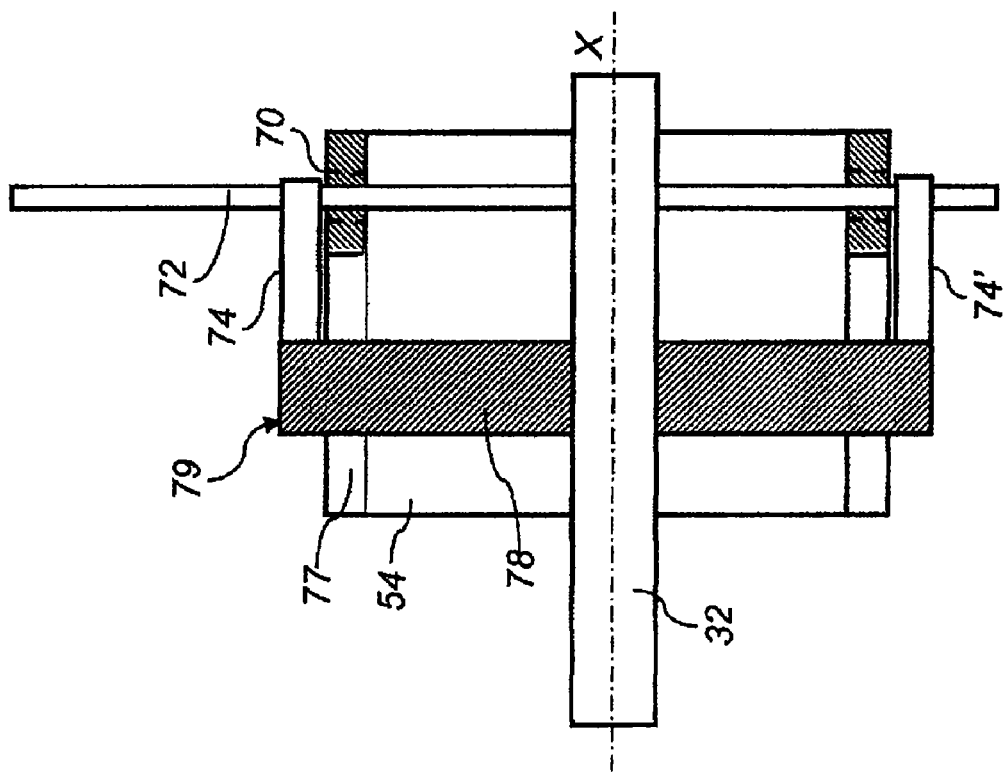
Fig. 8c
Fig. 8b

QUICK BOOSTER

BACKGROUND AND SUMMARY OF THE INVENTION

The invention relates to a brake booster and more specifically to a rapid-actuation brake booster that can be applied in particular to motor vehicles.

In automotive braking systems, there is generally a perceptible dead travel at the onset of braking as the brake pedal is actuated and during which the driver depresses the brake pedal without any hydraulic pressure being effectively introduced into the vehicle braking circuit.

Systems do exist that reduce this dead travel. One such system is the one described in French Patent Application No. FR 2 856 363.

That system comprises, as depicted in FIGS. 1 and 2:

a casing 2 of longitudinal axis X containing a skirt 6 mounted such that it can slide axially in a leaktight manner in the casing and delimiting a low-pressure first chamber 8 known as the front chamber and a variable-pressure second chamber 10 known as the rear chamber;

a piston 12 secured to the skirt 6;

a three-way valve 26 which, under the control of a control rod 28, can be used to isolate the front and rear chambers from one another, to place them in communication with one another, or to place the rear chamber at a high pressure with respect to the low pressure such as atmospheric pressure;

a sleeve 54 sliding axially inside the piston 12, an annular face 48 of this sleeve acting as a first valve seat, known as the equalizing seat, for the three-way valve 26;

a distributor-plunger 32 which has an annular face 50 acting as a second valve seat, known as the inlet valve seat, for the three-way valve 26;

a first key 84 passing at right angles to the axis X through two diametrically opposed openings 86 in the piston and two diametrically opposed slots 88 in the sleeve 54. The key 84 is fixedly mounted in the pneumatic piston 12; and a second key 90 passing at right angles to the axis X through the piston and the sleeve 54, this second key acting as a return axial end stop for the distributor-plunger 32.

The way in which a booster such as this works is as follows:

In the rest position (FIGS. 1 and 2), the valve shutter 46 is away from the first valve seat or equalizing valve 48 (borne by the sleeve 54) and places the front chamber 8 in communication with the rear chamber 10. The valve shutter 46 rests against the second inlet valve seat 50 thus isolating the rear chamber from atmospheric pressure.

At the start of a braking phase, as the driver depresses the brake pedal, the control rod 28 is moved axially forward, the valve shutter 46 then presses against the first valve seat 48, isolating the rear chamber from the front chamber and moves away from the second seat 50 allowing the rear chamber to be supplied with air at atmospheric pressure. Because of the pressure difference between the front chamber and the rear chamber, the skirt 6 and the piston 12 are moved forward. The first valve seat 48 borne by the sleeve 54 is stationary as long as the clearance C between the key 84 and the front end of the second slots 88 has not been taken up.

The spring 58 keeps the sleeve 54 in a set axial position with respect to the casing of the booster as long as the piston 12 has not covered a set travel C. The hydraulic piston of the master cylinder is pushed by the pneumatic piston which itself carries along the auxiliary piston 126 which moves away from the sensor. When the pressure in the master cylinder is above a set pressure high enough for the auxiliary piston 126 to be able to overcome the force of the jump spring 138, the auxiliary piston is pushed back toward the sensor until it comes into contact therewith and then passes on the reaction of the hydraulic circuit to the brake pedal.

When the pneumatic piston 12 has covered the travel C (see FIG. 2), the front face 100 of the key 84 which is fixed with respect to the pneumatic piston comes to rest against the front end of the slots 88 of the sleeve. The sleeve is then axially tied to the movement of the piston. The valve shutter 46 comes into contact with the inlet valve seat 50 and interrupts the supply of air at atmospheric pressure to the rear chamber. The driver has then to depress the brake pedal further in order to increase the intensity of braking.

The travel C is preferably chosen so that it corresponds to the dead travel of the master cylinder, that is to say with the travel that the hydraulic piston needs to cover within the master cylinder in order to begin to cause the pressure of the brake fluid in the brakes to rise. As a result, the driver feels through the pedal only the travel needed to close the equalizing valve and to open the inlet valve and does not feel the dead travel of the master cylinder. Driver comfort is thus improved, because the driver has the impression of immediate braking.

Thereafter, the system enters a phase of braking proper. Equalizing is achieved when the driver keeps the level of braking at a determined intensity. The valve shutter 46 is then in contact with the equalizing seat 48 and the inlet seat 50, thus interrupting the supply of air at atmospheric pressure to the rear chamber.

The booster then enters a saturation phase which corresponds to the instant the booster no longer provides any additional boost, the pressure obtaining in the rear chamber being atmospheric pressure. The pneumatic piston can no longer move forward axially under the action of the movement of the skirt 6. As a result, the sleeve 54 and the equalizing seat 48 are immobile. Any additional braking force applied by the driver moves the control rod 28 and the inlet seat away from the valve shutter 46 although this additional force is no longer boosted. The increase in pressure in the master cylinder is equal to the additional force provided by the driver, divided by the cross section of the master cylinder piston.

At the end of braking, the driver releases the brake pedal at least partially. The distributor-plunger is then carried rearward with the control rod. The inlet valve seat 50 comes into contact with the valve shutter 46 to interrupt the supply of air at atmospheric pressure to the rear chamber and carries the shutter 46 away from the equalizing seat 48, placing the front chamber 8 and the rear chamber 10 in communication. The pressures across the skirt 6 then equalize and this skirt returns to the rest position under the action of the return spring. The rest position of the pneumatic piston 12 is set by the second key 90 resting against the annular bearing surface 119 of the casing 2. The distributor-plunger also returns to rest coming into abutment against the key 90. The travel C between the front end of the slot 88 and the front face 100 of the key 84 is reestablished under the action of the sleeve return spring 58. The booster is once again in a position ready to operate with minimal actuating travel.

In a system such as this it is found that it is necessary to have a peak load applied to the pedal when the key 84 has covered the travel C and comes into contact with the front end of the slots 88 in the sleeve 54. The purpose of the invention is to diminish this transition which is perceptible at the brake pedal.

The invention therefore relates to a brake booster which comprises:

a casing of given longitudinal axis;

an assembly comprising a skirt and a pneumatic piston which is mounted to slide in a leaktight manner in the casing along the longitudinal axis, said skirt-and-piston assembly dividing the interior space of the casing into a low-pressure front chamber and a variable-pressure rear chamber;

a three-way valve actuated by a control rod mounted in a longitudinal passage pierced in the pneumatic piston, the said control rod being connected via a first longitudinal end to a brake pedal;

a distributor-plunger that can move, in the said piston, along the said longitudinal axis under the control of a second end of the said control rod, the said distributor-plunger comprising a sensor for applying the force of the control rod to a hydraulic piston of a master cylinder via a reaction device, the said skirt-and-piston assembly transmitting a pneumatic boost force to the hydraulic piston of the master cylinder;

a sleeve mounted to slide in a leaktight manner in the pneumatic piston along the said longitudinal axis over a set first travel; and a securing means capable axially of connecting the said sleeve to the pneumatic piston when the said pneumatic piston has covered the set travel.

The three-way valve comprises a first valve seat and a second valve seat and a valve shutter intended to be pressed against the first and/or second valve seat. The second valve seat is borne by a first longitudinal end of the distributor-plunger. The first valve seat is borne by a first longitudinal end of the said sleeve.

According to the invention, the securing means comprises a device for gradually moving the sleeve according to the movement of the piston.

As a preference, the gradual movement device comprises a face that is inclined with respect to the said longitudinal axis and it is intended to transmit to the said sleeve a movement force along the longitudinal axis as supplied by the piston.

According to one embodiment of the invention, the said inclined face belongs to a front face of a key. This key has a first end which rests against a part secured to the piston or against the piston itself, and a second end which rests against the casing of the booster or against a part which itself rests against the casing of the booster.

In this embodiment, the first end or the second end of the key is fixed by an articulation to the part against which it rests.

Provision will then advantageously be made for the first end to be fixed to the piston by the said articulation and for the second end to have a curved portion which rests against the casing of the booster or against a part which itself rests against the casing of the booster.

As a preference, the key passes through the walls of the sleeve transversely to the said axis via slots, the inclined face of the key being intended to rest against front ends of the slots of the sleeve.

Under braking, provision will advantageously be made for the inclined face of the key to rest against the front ends of the two slots of the sleeve.

The invention also relates to an alternative form of embodiment in which there is at least one rod which passes at right angles to the said longitudinal axis through the walls of the sleeve via openings of which at least one wall is inclined with respect to the said longitudinal axis. Control means control the longitudinal movement along the inclined wall of the rod and allow an axial movement of the piston to be transmitted to the sleeve via the said rod.

According to this alternative form of embodiment, the said control means comprises a mitered part that has at least one face that is inclined with respect to the said longitudinal axis in the same direction as the inclined walls of the openings in the sleeve.

Provision will then advantageously be made for the inclined walls of the openings in the sleeve to make a first angle (X) with the longitudinal axis (X). The inclined face of the mitered part (79) makes a second angle ($\beta$) with the longitudinal axis. In such an instance, provision will be made for the first angle (X) to be greater than the second angle ($\beta$).

Furthermore, provision may also be made for the device according to the invention to comprise two rods that are parallel and symmetric with one another with respect to the longitudinal axis. The mitered part then has a shape that is symmetric about the said axis.

According to one embodiment of this alternative form, the two rods are made as a single piece and are joined together by a spring joint.

The invention also relates to another alternative form of embodiment according to the invention, whereby a key passes transversely through the sleeve via apertures. These apertures have a face that is inclined with respect to the said longitudinal axis. This inclined face rests against front ends of the said apertures. An axial movement of the said key, brought about by the movement of the piston, then causes the key to move vertically.

This alternative form of embodiment will then preferably provide a bearing part that has an inclined face against which one end (81) of the key rests.

Advantageously, the inclined face of the bearing part is substantially parallel to the inclined face of the said key.

The invention also relates to an additional alternative form of embodiment in which the sleeve has an aperture that is inclined with respect to the said longitudinal axis and a pin. A first end of this pin can move in this aperture and a second end can slide in a cavity in the piston.

Provision will then be made for the sleeve to be able to rotate in order to allow the first end of the pin to slide in the aperture.

BRIEF DESCRIPTION OF THE DRAWINGS

The various objects and features of the invention will become more clearly apparent in the description which will follow and in the attached figures which depict:

FIGS. 7*a* to 7*c*: the device of FIG. 6 in various states, illustrating how it works;

FIGS. 8*a* to 8*c*: detailed views of the device of FIG. 6;

DETAILED DESCRIPTION

One exemplary embodiment of the device of the invention will now be described with reference to FIGS. 3 and 4.

Figure 1:
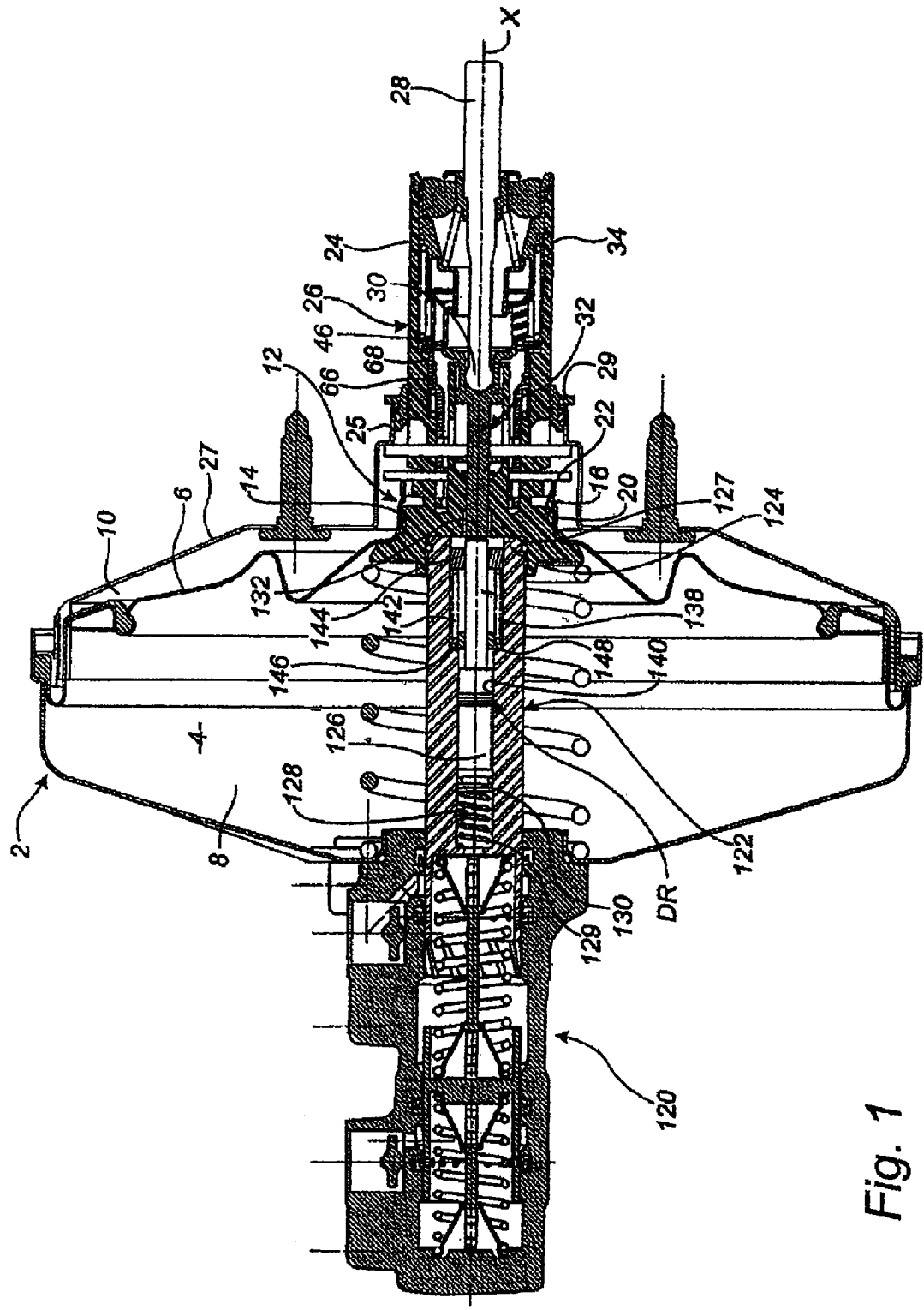
FIG. 1: a brake booster of the type known in the art and already described earlier.
Figure 2:
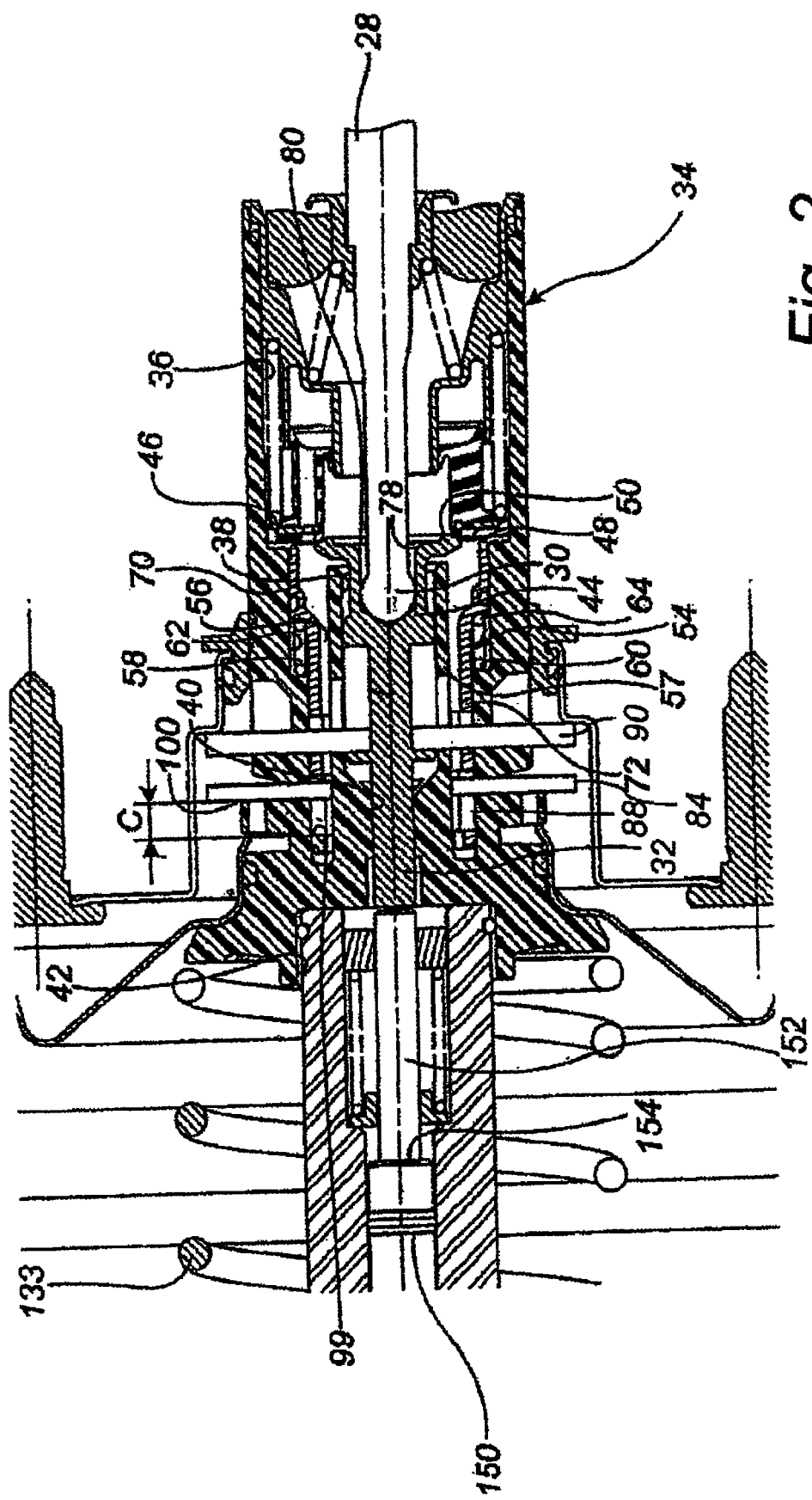
FIG. 2: a more detailed view of the brake booster of FIG. 1, likewise described earlier.

This device is applied to a brake booster like that of FIG. 1. In the FIG. 3, only that part of the booster that contains the device of the invention has been depicted. The components depicted in FIGS. 3 and 4 bear the same references as those components of FIGS. 1 and 2 which perform the same functions.

Figure 3:
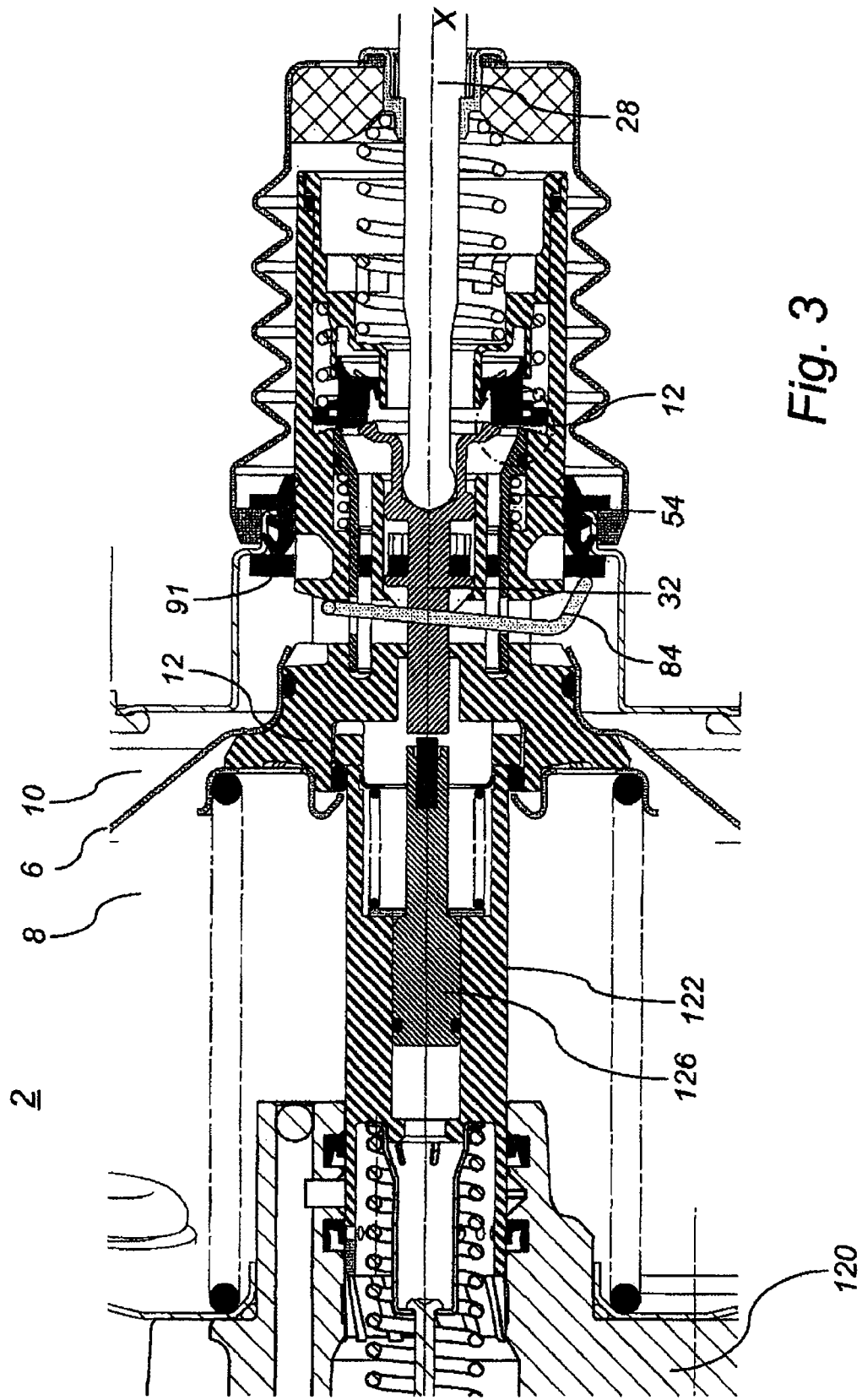
FIGS. 3 and 4: one exemplary embodiment of the device according to the invention, as applied to a pneumatic brake booster.
Figure 4:
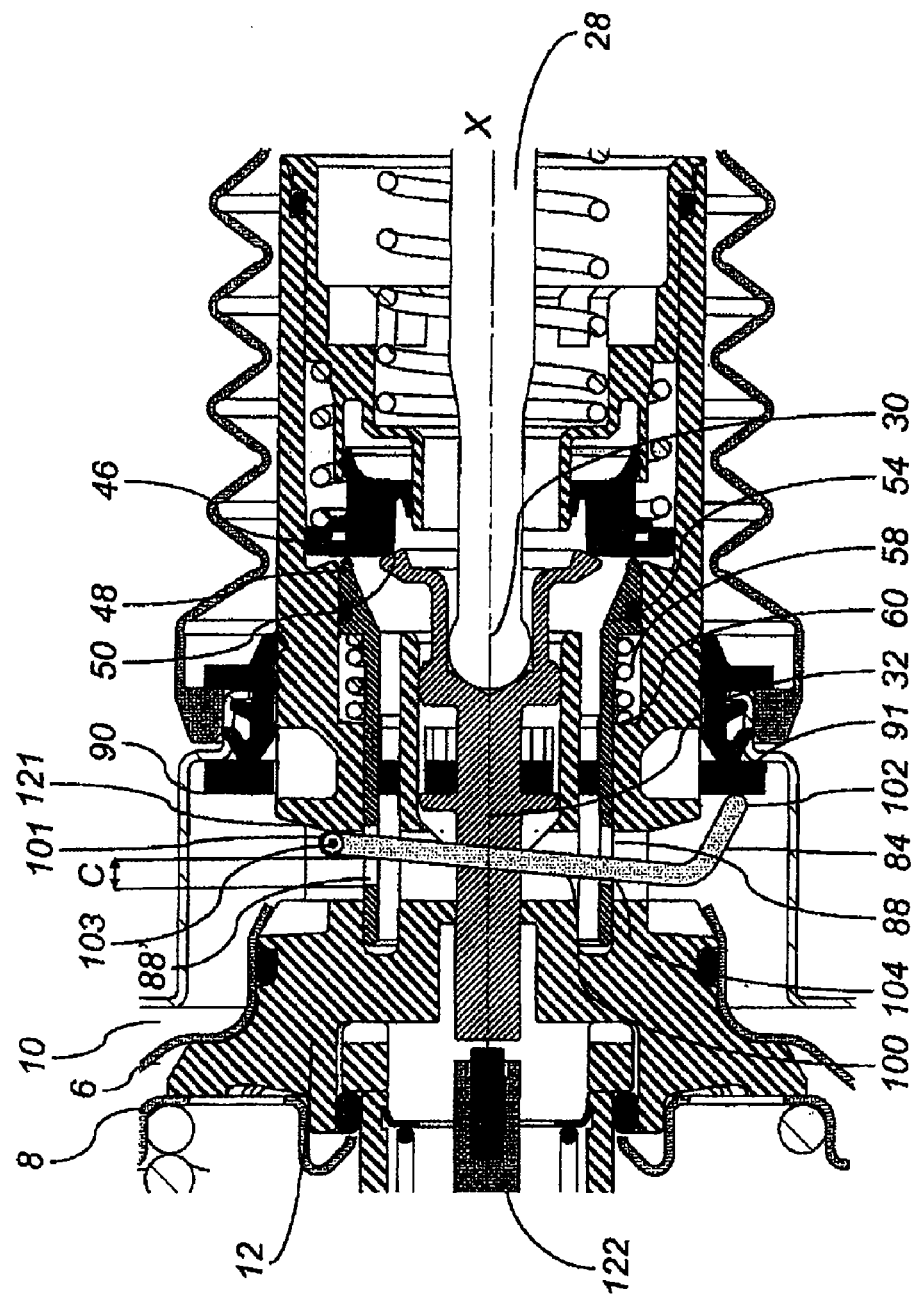

FIGS. 3 and 4 will therefore be described in conjunction with the example of a brake booster shown in FIG. 1.

FIG. 3 therefore partially depicts the casing 2 in which a skirt 6 delimits a (low pressure) front chamber 8 and a rear chamber 10 that can be placed either at the same pressure as the front chamber or at atmospheric pressure.

A pneumatic piston 12 is secured to the skirt and slides along the axis of the casing 2 of the booster.

A sleeve 54 slides axially inside the piston 12. A spring 58, that rests against the piston 12, pushes the sleeve 54 backward (to the right in the figures).

Inside the sleeve, a distributor-plunger 32 slides axially under the control of a control rod 28 controlled by a brake pedal which has not been depicted.

Incidentally, a three-way valve situated inside the piston 12 allows either the front chamber 8 to be placed in communication with the rear chamber 10, or the rear chamber to be placed at atmospheric pressure, or the rear chamber to be isolated. To do that, as depicted in FIG. 4, the three-way valve comprises a shutter 46 of annular shape capable of being in contact either with an equalizing valve seat 48 borne by an annular end of the sleeve 54 or with an inlet valve seat 50 borne by an annular end of the distributor-plunger 32.

The sleeve 54 is normally pushed backward (to the right in the figures), that is to say toward the shutter 46, by a spring 58 which rests against a shoulder 60 of the piston 12.

The device of the invention also comprises a key 84 which passes through the sleeve 54 via slots 88, 88'.

According to the invention, this key comprises a face 100 that is inclined with respect to the axial direction of the booster. In addition, this key has a first end 101 which rests on a front face 121 of the pneumatic piston 12 and a second end 102 which rests on a fixed part of the booster. In the specific example of the device of FIGS. 3 and 4, the second end 102 rests on a part 90 which at rest rests against a shoulder belonging to the casing of the booster.

In addition, one of the ends of the key may be fixed by an articulation to the part against which it rests. For example, in FIGS. 3 and 4, the end 101 of the key 84 is articulated on a pin 103 secured to the face 121 of the piston 12. The end 102 rests against the face 91 of the part 90 and can therefore rotate about the pin 103.

In order for the face 100 of the key 84 to be inclined with respect to the axis of the booster, the key 84 has a bent shape in FIGS. 3 and 4, although this is not compulsory; all that is required is for the end 102 to rest against the booster casing or against a part (such as 90) which is connected to the booster casing.

The way in which the device of FIGS. 3 and 4 works will now be described with reference to FIG. 3 and to FIGS. 5a to 5d.

Figure 5A:
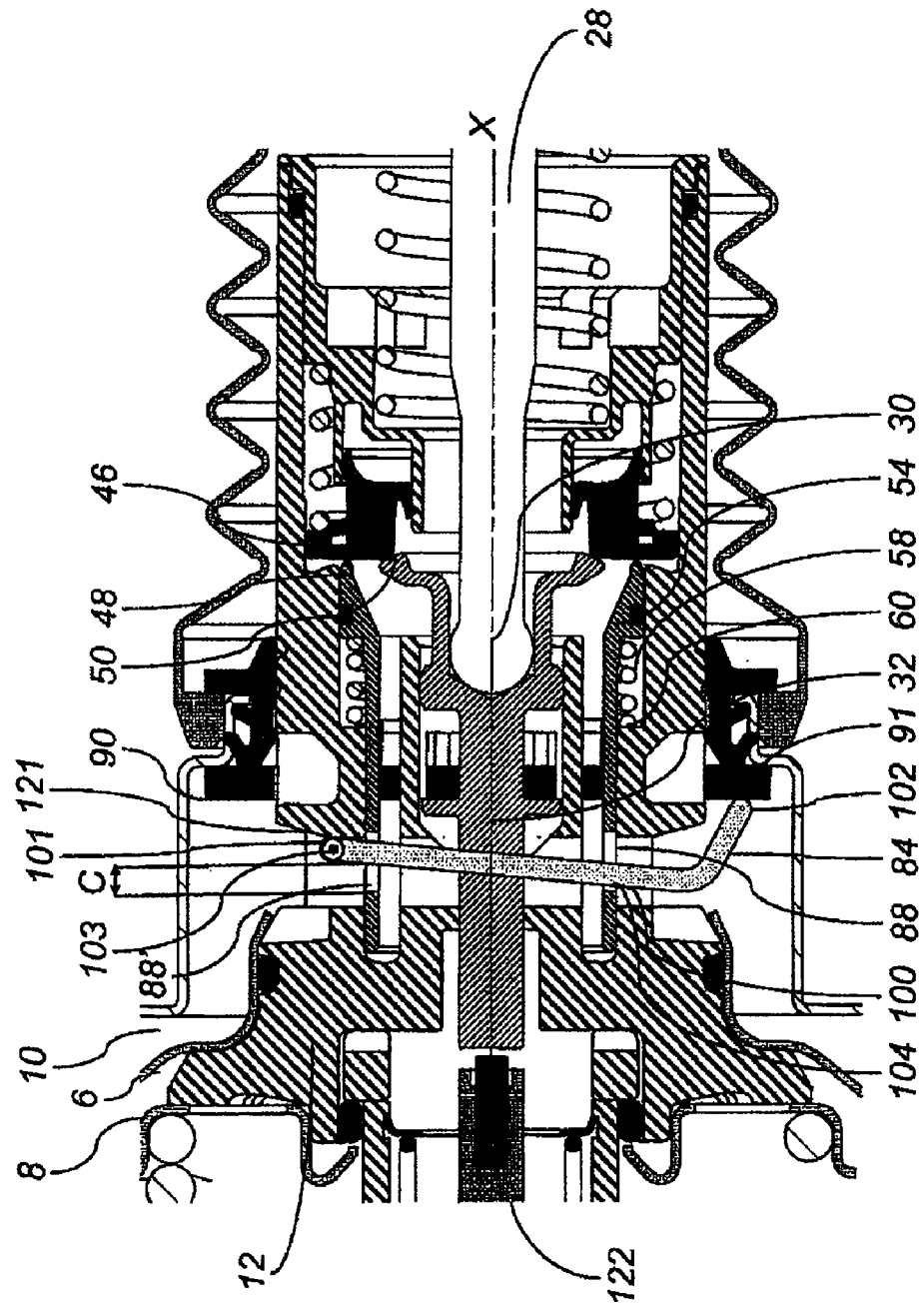
FIGS. 5*a* to 5*d*: various states of the device of FIG. 3 and illustrating how it works.

When the braking system is at rest (that is to say when the driver is not depressing the brake pedal), the system is as depicted in FIG. 5a. The sleeve 54 is pushed backward by the spring 58 but the shutter 46 is away from the equalizing valve seat 48 borne by the sleeve 54. This space between the shutter 46 and the valve seat 48 places the front chamber 8 and the rear chamber 10 in communication. The shutter 46 rests against the inlet valve seat 50 and thus isolates the rear chamber 10 from atmospheric pressure.

Figure 5B:
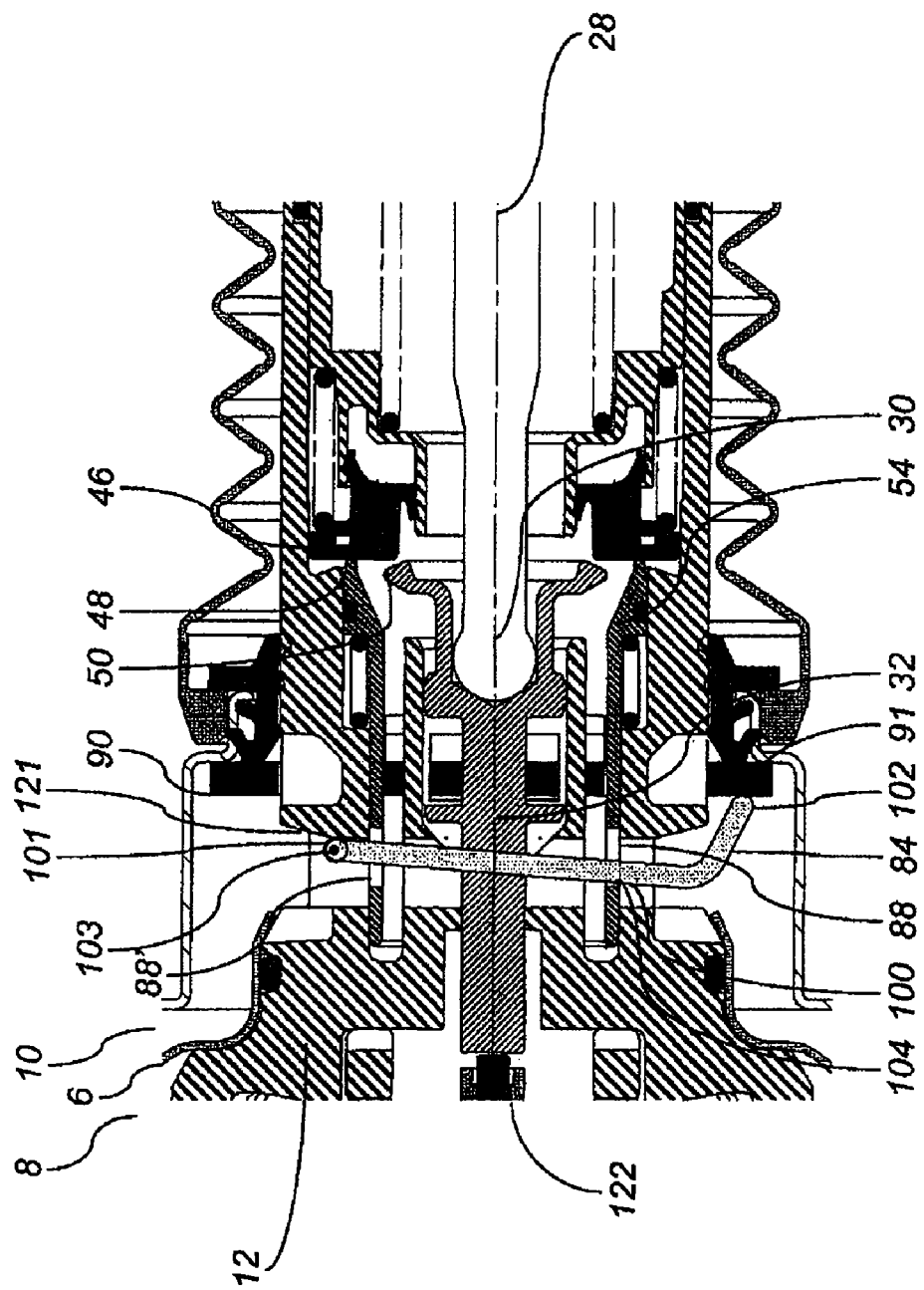

At the start of the braking phase represented by FIG. 5b, as the driver depresses the brake pedal, the control rod 28 is moved axially forward (to the left in the figures) and the distributor-plunger 32 moves forward. The valve seat 50 moves forward. The shutter 46 also moves forward and is pressed against the equalizing valve seat 48 borne by the sleeve 54. The rear chamber 10 is isolated from the front chamber 8. As the distributor-plunger moves forward, the shutter 46 moves away from the inlet valve seat 50, allowing air at atmospheric pressure into the rear chamber 10.

Because of the pressure difference between the front chamber and the rear chamber, the skirt 6 and the piston 12 are moved forward. The equalizing valve seat 48 borne by the sleeve 54 is kept pressed firmly against the shutter 46 by the spring 58. The hydraulic piston of the master cylinder 122 is pushed by the pneumatic piston 12 and itself carries along the auxiliary piston 126 (see FIG. 1) which moves away from the sensor. When the pressure in the master cylinder exceeds a set pressure high enough for the auxiliary piston 126 to be able to overcome the force of the jump spring, the auxiliary piston 126 is pushed back toward the distributor-plunger 32 until it comes into contact therewith and then passes the reaction of the hydraulic circuit on to the brake pedal.

Figure 5C:
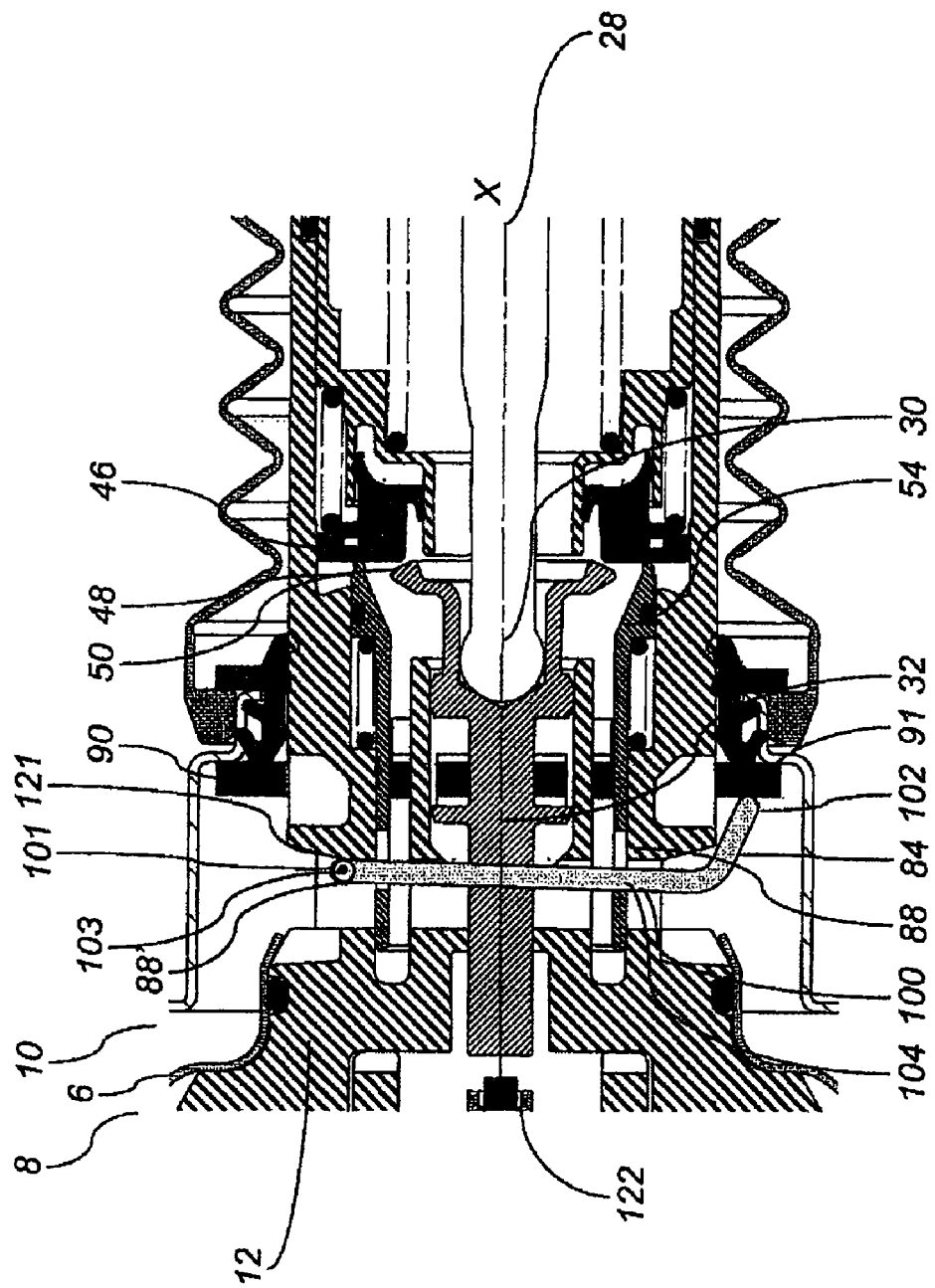

During this operation, the pneumatic piston 12 as it moves forward, moves the articulation pin 103 of the end 101 of the key 84 (see FIG. 5c). The region 104 of the surface 100 of the key 84 moves forward less rapidly than does the region of the key situated on the same side as the articulation 104. This region 104 pushes the sleeve 54 forward but at a slower pace than the rate at which the piston travels. Furthermore, the spring 54 has a tendency to move the sleeve 54 backward. Because of the more rapid forward movement of the piston and under the effect of the spring 58, the sleeve moves backward relative to the piston.

The key 84 pivots about the pin 103 because of the braking effect of the left-hand end of the slot 88 of the sleeve 54 which opposes its movement.

Figure 5D:
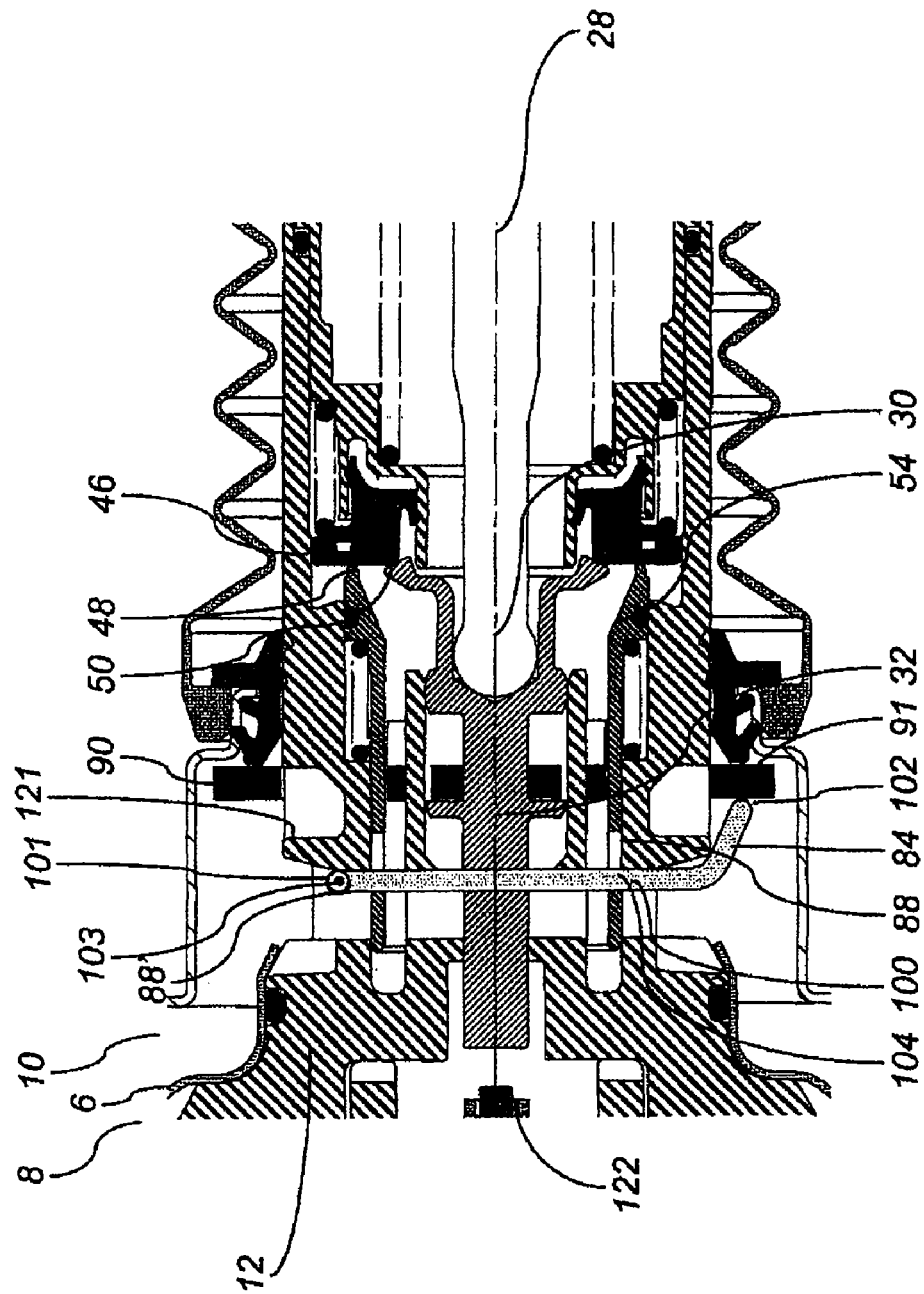
Figure 6:
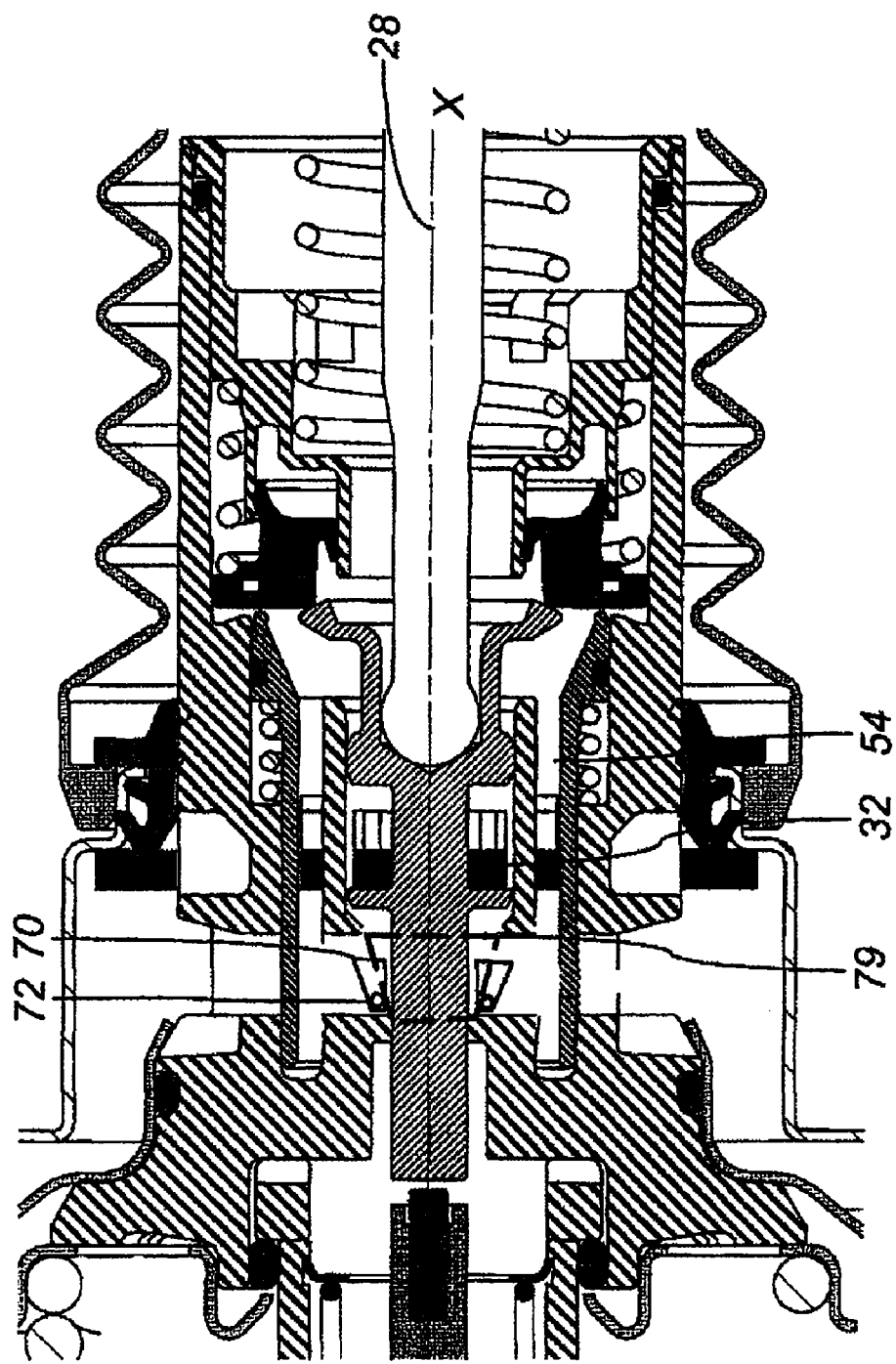
FIG. 6: one alternative form of embodiment of the device according to the invention.

In FIG. 5d, the front face 100 of the key 84 is pressed firmly against the front ends of the slots 88 and 88' of the sleeve. The key 84 is pressed firmly against the front face 121 of the pneumatic piston 12 and is therefore now fixed relative to the piston. The sleeve is tied axially to the movement of the piston.

The shutter 46 comes into contact with the inlet valve seat 50 and interrupts the supply of air at atmospheric pressure to the rear chamber. The driver has therefore to depress the brake pedal further in order to increase the intensity of braking.

The shutter 46 is then in contact with the equalizing valve seat 48 of the sleeve 54 and with the inlet valve seat 50, interrupting the supply of air at atmospheric pressure to the rear chamber.

FIG. 5d depicts the booster in the phase during which it is no longer providing any additional boost. The increase in pressure in the master cylinder is equal to the additional force supplied by the driver divided by the cross section of the master cylinder piston.

The travel C (see FIG. 4) represented by the distance traveled by the front face 100 of the key 84 in the upper slot 88' of the sleeve 54 will preferably be chosen so that it corresponds to the dead travel of the master cylinder, that is to say to the travel that the hydraulic piston needs to cover within the master cylinder in order to cause the pressure of the brake fluid to begin to rise in the brakes.

This being the case, not only does the driver feel through the pedal only the travel needed to close the equalizing valve and to open the inlet valve, without feeling the dead travel of the master cylinder, but also, the transition between this operation and actual braking occurs gradually.

Thereafter, when the driver releases the brake pedal at least in part, the distributor-plunger 32 is carried backward with the control rod. The inlet valve seat 50 comes into contact with the shutter 46 and carries the shutter 46 away from the equalizing seat 48, placing the front chamber 8 and the rear chamber 10 in communication. The pressures across the skirt 6 equalize and the skirt returns to the rest position. The system is now back in the state depicted in FIG. 5a.

An alternative form of embodiment of the system according to the invention will now be described with reference to FIGS. 6 to 8c. This system comprises at least one rod 72 which passes through the sleeve 54 at right angles to the axis of the sleeve.

As a preference, for the purposes of balancing the sleeve, the system comprises two rods 72 and 72' positioned symmetrically with respect to the axis of the sleeve. These rods pass through the wall of the sleeve through openings such as 70 and 70'. Each opening has a wall 71 which is inclined with respect to the axis of the sleeve at an angle β (see FIG. 7b).

Furthermore, a part 79 of mitered shape can move axially between the two rods 72 and 72'. The mitered faces 74 and 74' of the part 79 are inclined in the same direction as the faces 71 and 71' with respect to the axis of the sleeve. Their purpose is to press the rods 72 and 72' respectively against the faces 71 and 71'. The angular inclination α of the faces 74 and 74' is less than the angle β so that as the mitered part 79 moves under the effect of a force indicated by the arrow F, the rods 72 and 72' move in the opposite direction to the arrow F. This force F is preferably provided by the movement of the piston 12.

At rest, when the driver is not depressing the brake pedal, the part 79 is in the position depicted in FIG. 7a.

When the driver depresses the brake pedal, the piston 12 moves forward (to the left in the figures) as described previously. The part 79, as it moves forward, forces the rods 72 and 72' to move backward.

At the same time, the part 79 gradually carries the sleeve 54 forward thus causing the valve 48-46 to open gradually.

The system passes through the situation depicted in FIG. 7b until the rods come into contact with the faces 75 and 75' of the openings 70 and 70' (see FIG. 7c).

When the rods 72 and 72' are in contact with the faces 75 and 75', the part 79 almost directly couples the piston to the sleeve which will thenceforth follow the same movements as the piston.

The angular inclinations α and β are calculated such that the rods 72 and 72' put up resistance to the movement of the mitered part 79. Thus, as the part 79 moves, the sleeve 54 will have a tendency to be carried gradually forward.

In the context of the invention, friction between the rods 72 and 72' and the faces 71, 71', 74, 74' is optimized to cause the sleeve to be carried along gradually.

Figure 8A:
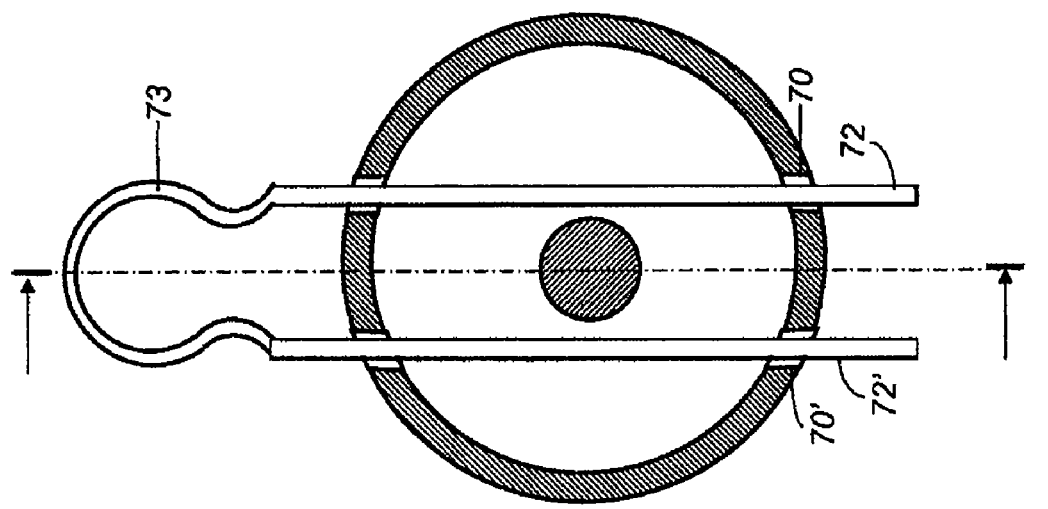

As has been depicted in FIG. 8a, the rods 72 and 72' are spaced apart so that they lie one on each side of the distributor-plunger 32. They may be made as a single piece. For example, they may be connected by a sprung element 73 so that the two rods have a tendency to converge toward one another.

In FIGS. 8b and 8c, the part 79 has two mitered portions 74 and 74' situated one on each side of the sleeve 54. The rods 72 and 72' are separated from one another while at the same time remaining parallel when the mitered portions 74 and 74' are driven forward by the piston.

Figure 9A:
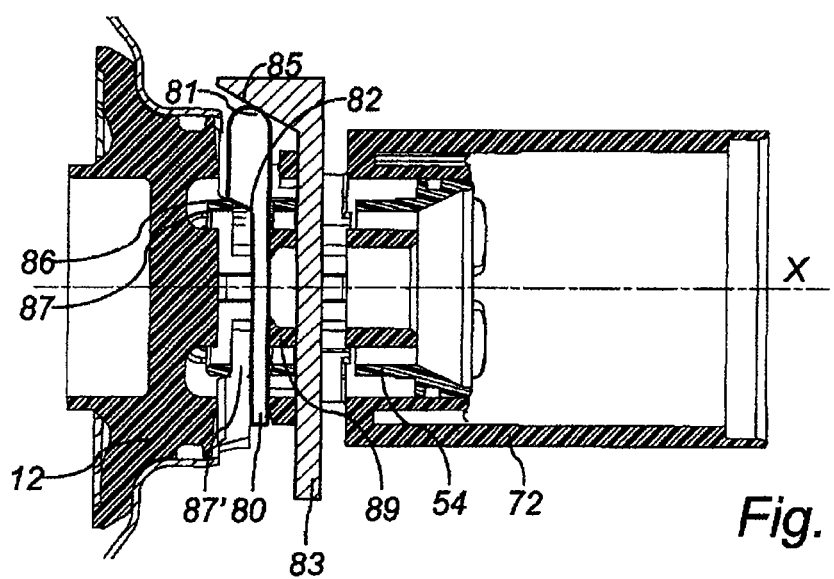
FIGS. 9*a* to 9*c*: an alternative form of embodiment of the device according to the invention.
Figure 9B:
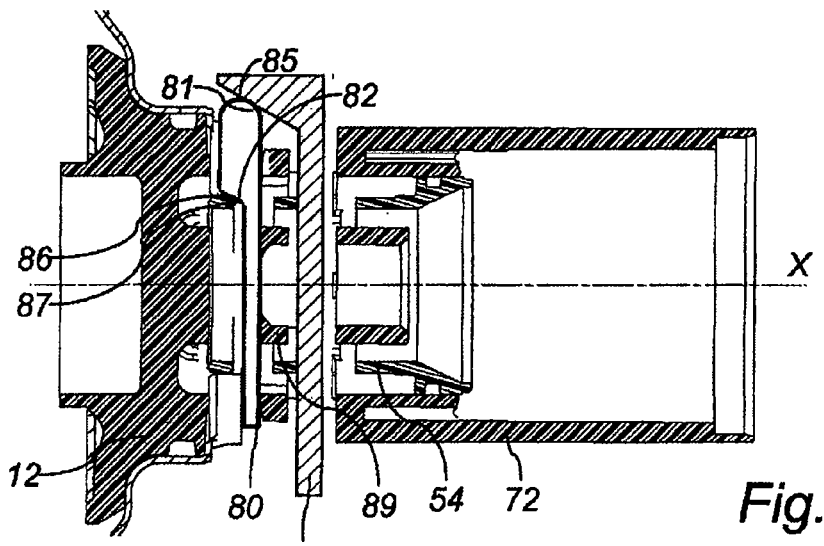
Figure 9C:
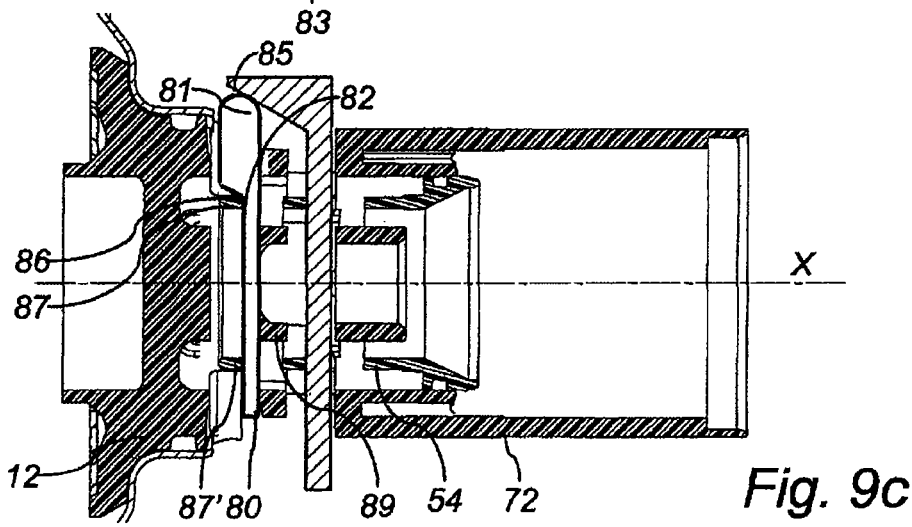

FIGS. 9a to 9c depict an alternative form of embodiment of the system of the invention.

A key 80 passes right through the sleeve 54 through openings 87 and 87'. The key 80 has a face 82 that is inclined with respect to the axis of the sleeve. This face 82 is situated close to an edge 86 of one of the openings such as 87.

Further, the upper portion 81 of the key 80 rests against an inclined face 85 of a bearing piece 83. In the rest position, the part 83 rests against the cover 27 of the booster casing 2 (FIG. 1). The face 85 is preferably parallel or substantially parallel to the face 82.

Upon a command to brake, as described earlier, the piston 12 moves forward (to the left). The part 89 belonging to the piston pushes the key 80 forward. The inclined face 82 of the key slides along the edge 86 of the opening 87. In order to be able to move forward, the key rises vertically (in FIG. 9a) and rubs against the inclined face 85. This movement is depicted in FIG. 9b.

According to a preferred embodiment of the invention, the upper portion 81 of the key, which is in contact with the inclined face 85, is of rounded or spherical shape.

As the piston moves, the movement of the key causes the sleeve 54 to move but at a slower speed than the rate at which the piston moves because of the friction between the end 81 of the key and the face 85 and because of the friction between the face 82 and the end 86 of the opening 87. The key then comes into abutment (FIG. 9c) against the front end of the opening 87 and the sleeve 54 is carried forward with practically no friction by the piston.

This alternative form of embodiment has therefore made it possible to obtain a gradual movement of the sleeve 54 as the booster piston moves.

Figure 10A:
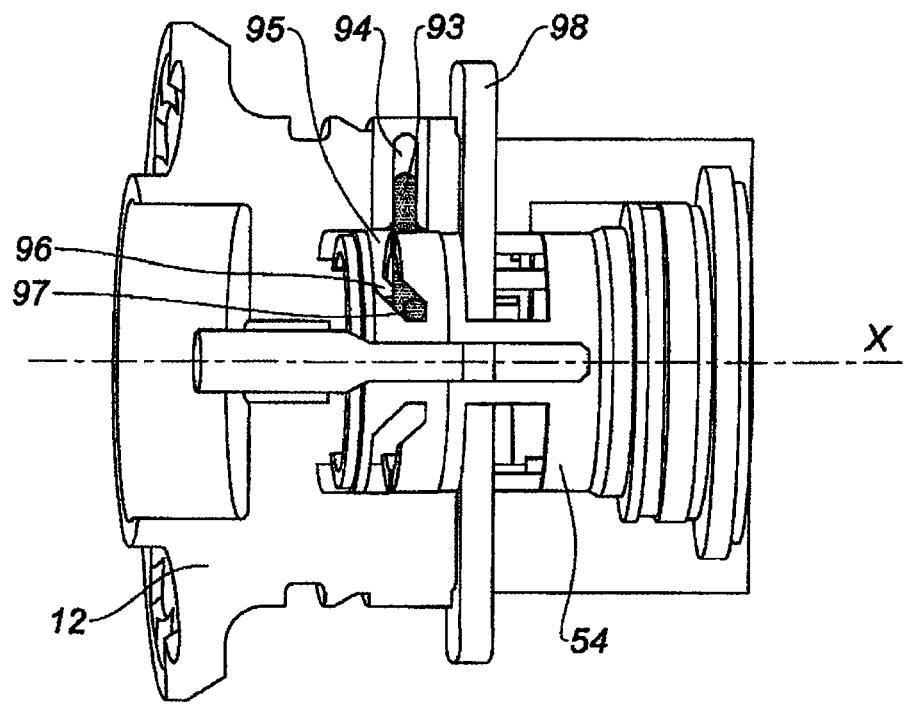
FIGS. 10*a* to 10*b*: another alternative form of the device according to the invention.
Figure 10B:
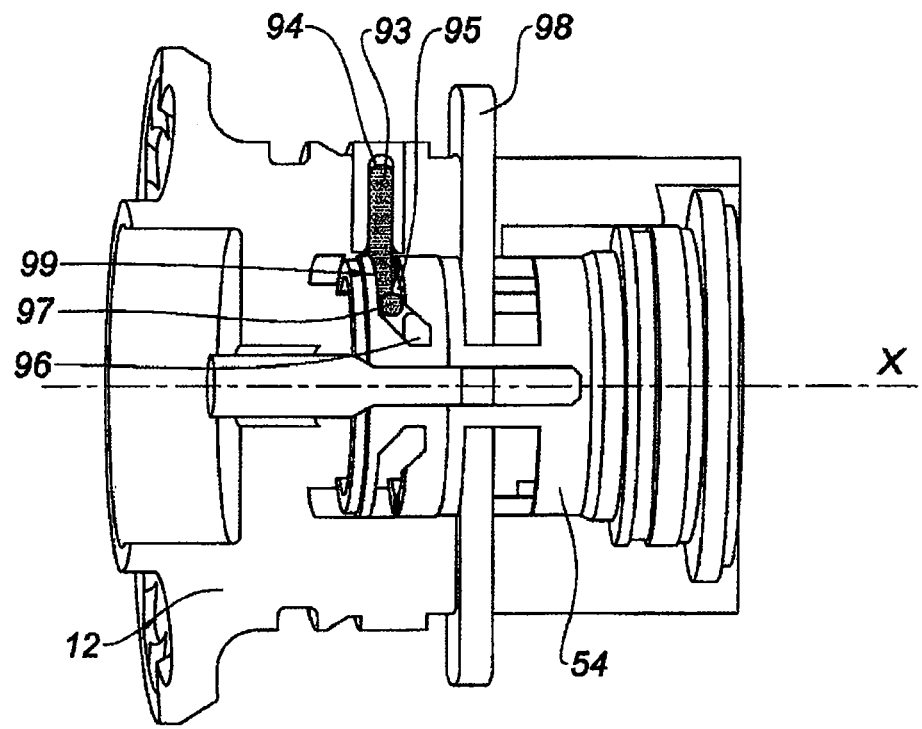

FIGS. 10a and 10b depict another alternative form of the embodiment of the system of the invention.

In this alternative form, the wall of the sleeve 54 has at least one aperture 96 the guide walls of which are inclined with respect to the longitudinal axis X of the sleeve. A pin 99 has a first end 97 that can move between the guide walls of this aperture 96. The pin also has a second end 93 which can slide in a cavity 94 of the piston or of a part secured to the piston.

Furthermore, the sleeve 54 has the ability to rotate about its axis as it moves axially so as to allow the first end 97 of the pin to move in the aperture 96.

FIG. 10a depicts this system in a state of rest.

When a command to brake is given, the piston is carried forward as described earlier.

The piston drives the pin 99 which tends to drive the sleeve via its end 97. However, this sleeve moves between the guide walls of the aperture 96. Because of the inclination of the guide walls with respect to the longitudinal axis X, the sleeve moves less rapidly as compared with the rate of movement of the piston. As in the previous embodiments, gradual movement of the sleeve is thus obtained.

It will be noted that as the end 97 moves, the end 93 of the pin slides in the cavity 94 of the piston.

This operation continues until the end 97 reaches the position depicted in FIG. 10b. The piston then acts directly on the movement of the sleeve 54.

It can thus be seen, from the various embodiments thus described, that the invention allows the sleeve 54 to move gradually as the piston moves. This improves the feel of the brake pedal at the start of the braking phase.

The invention claimed is:
1. Brake booster comprising:
a casing (2) of longitudinal axis (X);
an assembly comprising a skirt (6) and a pneumatic piston (12) which is mounted to slide in a leaktight manner in the casing (2) along the longitudinal axis (X), said skirt-and-piston assembly (6, 12) dividing the interior space

(4) of the casing (2) into a low-pressure front chamber (8) and a variable-pressure rear chamber (10);

a three-way valve (26) actuated by a control rod (28) mounted in a longitudinal passage (34) pierced in the pneumatic piston (12), the said control rod (28) being connected via a first longitudinal end to a brake pedal;

a distributor-plunger (32) that can move, in the said piston, along the said longitudinal axis (X) under the control of a second end of the said control rod (28), the said distributor-plunger (32) comprising a sensor for applying the force of the control rod (28) to a hydraulic piston (122) of a master cylinder via a reaction device, the said skirt-and-piston assembly (6, 12) transmitting a pneumatic boost force to the hydraulic piston (122) of the master cylinder;

a sleeve (54) mounted to slide in a leaktight manner in the pneumatic piston (12) along the said longitudinal axis (X) over a set first travel (C);

a securing means capable axially of connecting the said sleeve (54) to the pneumatic piston (12) when the said pneumatic piston has covered the set travel (C); and the said three-way valve (26) comprising a first valve seat (48) and a second valve seat (50) and a valve shutter (46) intended to be pressed against the first and/or second valve seat (48, 50), the said second valve seat (50) being borne by a first longitudinal end of the distributor-plunger (32), the first valve seat being borne by a first longitudinal end of the said sleeve (54), characterized in that the securing means comprises a device for gradually moving the sleeve according to the movement of the piston.

2. Brake booster according to claim 1, characterized in that the gradual movement device comprises a face (100, 71, 71', 82, 82') that is inclined with respect to the said longitudinal axis (X) and it is intended to transmit to the said sleeve (54) a movement force along the longitudinal axis (X) as supplied by the piston (12).

3. Brake booster according to claim 2, characterized in that the said inclined face (100) belongs to a front face of a key (84) that has a first end (101) which rests against a part secured to the piston (12) or against the piston itself, and a second end (102) which rests against the casing of the booster or against a part which itself rests against the casing of the booster.

4. Brake booster according to claim 3, characterized in that the first end or the second end (101) or (102) of the key (84) is fixed by an articulation (103) to the part against which it rests.

5. Brake booster according to claim 4, characterized in that the first end (101) is fixed to the piston by the said articulation (103) and in that the second end (102) has a curved portion which rests against the casing of the booster or against a part (90) which itself rests against the casing of the booster.

6. Brake booster according to claim 5, characterized in that the key (84) passes through the walls of the sleeve (54) transversely to the said axis (X) via slots (88, 88'), the inclined face (100) of the key (84) being intended to rest against front ends of the slots of the sleeve.

7. Brake booster according to claim 6, characterized in that, under braking, the inclined face (100) of the key (84) rests against the front ends of the two slots (88, 88') of the sleeve.

8. Brake booster according to claim 3, characterized in that it comprises at least one rod (72, 82') which passes at right angles to the said longitudinal axis (X) through the walls of the sleeve via openings (70, 70') of which at least one wall (71, 71') is inclined with respect to the said longitudinal axis (X), control means (79) controlling the longitudinal movement along the inclined wall (71, 71') of the rod and allowing an axial movement of the piston (12) to be transmitted to the sleeve via the said rod (72, 72').

9. Brake booster according to claim 8, characterized in that the said control means comprises a mitered part (79) that has at least one face (74, 74') that is inclined with respect to the said longitudinal axis (X) in the same direction as the inclined walls (71, 71') of the openings in the sleeve.

10. Brake booster according to claim 9, characterized in that the inclined walls of the openings in the sleeve make a first angle (α) with the longitudinal axis (X), the inclined face of the mitered part (79) makes a second angle (β) with the longitudinal axis, and in that the first angle (α) is greater than the second angle (β).

11. Brake booster according to claim 10, characterized in that it comprises two rods (72, 72') that are parallel and symmetric with one another with respect to the longitudinal axis (X), the mitered part (79) having a shape that is symmetric about the said axis (X).

12. Brake booster according to claim 11, characterized in that the two rods (72, 72') are made as a single piece and are joined together by a spring joint (73).

13. Brake booster according to claim 3, characterized in that it comprises a key (80) which passes transversely through the sleeve (54) via apertures (87, 87') and which has a face (82) that is inclined with respect to the said longitudinal axis (X), the said inclined phase resting against front ends (82) of the said apertures (87, 87'), an axial movement of the said key (80), brought about by the movement of the piston, causing the key to move transversely.

14. Brake booster according to claim 13, characterized in that it comprises a bearing part (83) that has an inclined face (85) against which one end (81) of the key rests.

15. Brake booster according to claim 14, characterized in that the inclined face (85) of the bearing part (83) is substantially parallel to the inclined face (82) of the said key (83).

16. Brake booster according to claim 3, characterized in that the sleeve (54) has an aperture (96) that is inclined with respect to the said longitudinal axis (X) and a pin (99) a first end (97) of which can move in this aperture and a second end (93) of which can slide in a cavity of the piston (12).

17. Brake booster according to claim 16, characterized in that the sleeve (54) is able to rotate in order to allow the first end (97) of the pin (99) to slide in the aperture (96).

18. Brake booster according to claim 1, characterized in that the key (84) passes through the walls of the sleeve (54) transversely to the said axis (X) via slots (88, 88'), the inclined face (100) of the key (84) being intended to rest against front ends of the slots of the sleeve.

19. Brake booster according to claim 18, characterized in that, under braking, the inclined face (100) of the key (84) rests against the front ends of the two slots (88, 88') of the sleeve.

* * * * *